Aug. 24, 1965     J. S. BROWN     3,201,838
ROPE COUPLING
Filed March 18, 1964
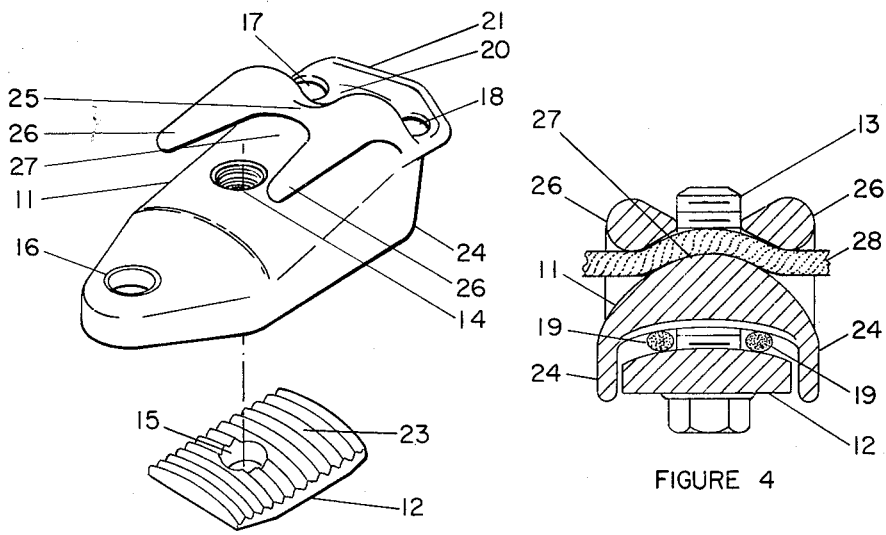
FIGURE 1
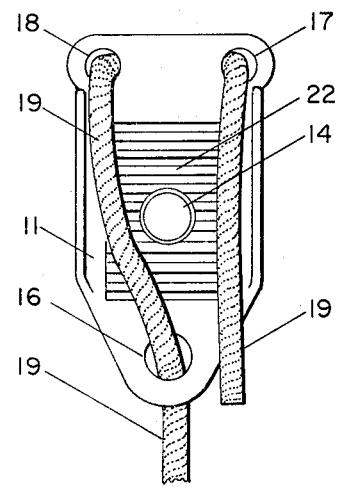
FIGURE 4
FIGURE 3
FIGURE 2
JOHN S. BROWN
INVENTOR.
BY: Harry M. Saragovitz,
Edward J. Kelly,
Herbert Berl &
Charles F. Murphy United States Patent Office 3,201,838
Patented Aug. 24, 1965

3,201,838
ROPE COUPLING
John S. Brown, Framingham, Mass., assignor to the United States of America as represented by the Secretary of the Army
Filed Mar. 18, 1964, Ser. No. 353,005
8 Claims. (Cl. 24—125)
(Granted under Title 35, U.S. Code (1952), sec. 266)

The invention described herein, if patented, may be manufactured and used by or for the Government for governmental purposes without the payment to me of any royalty thereon.

This invention relates to a cable connecting device and more particularly to a device for adjustably and releasably connecting the free end of one cable to another cable at a point between its ends where the longitudinal axis of the first cable is generally perpendicular to the longitudinal axis of the second cable.

This invention is particularly useful in the anchoring systems of air-supported shelters. Such shelters are widely used by both military and civilian organizations to protect equipment and supplies from environmental conditions. The shelters are normally made of flexible fabric or film and are erected and supported by blowing air into the shelter to establish air pressure somewhat greater than atmospheric pressure within the shelter. One of the principal advantages of this type of shelter is the complete absence of any rigid supporting members either inside or outside the shelter.

In order to retain air pressure within the shelter, the periphery thereof must be firmly anchored to the ground or other surface upon which the shelter is to be erected. A series of flexible slings or bridles are fixed to the shelter spaced around the periphery thereof and a continuous cable is threaded through the bridles leaving the portions of the cable between the bridles exposed on the exterior of the shelter. The shelter is anchored to the ground or other surface on which it is to be erected by connecting the exposed portions of this cable to anchoring devices fixed in the ground or other surface. When the shelter is erected, the cable assumes the configuration of a series of catenaries and it is, therefore, referred to as a catenary cable. Where this connection is made by a cable extending between a ground anchor or other anchoring device, some means must be used to connect this cable to the catenary cable. Such means should permit adjustment of the length of the ground anchoring cable and ease of removal from the catenary cable to permit rapid movement of the shelter in military situations. Further, since the catenary cable is susceptible to lateral movement as the shelter is subjected to various wind loadings, the connecting means should resist relative movement of the catenary cable therein to avoid abrading and fraying of the catenary cable. At the same time, the connecting means must be relatively simple and inexpensive since they are required in substantial quantity, e.g., thirty-three for the common 15½′ x 60′ air-supported shelter.

It is, therefore, an object of this invention to provide an improved connecting device for adjustably and releasably connecting the free end of one cable to another cable at a point between its ends where the longitudinal axis of the first cable is generally perpendicular to the longitudinal axis of the second cable.

Another object is to provide an improved coupling device for adjustably and releasably coupling a ground anchor cable to the catenary cable of an air-supported shelter.

Another object is to provide means for preventing slippage of a ground anchor cable in the device which connects it to the catenary cable of an air-supported shelter.

Another object is to provide means for preventing fraying of the catenary cable of an air-supported shelter by the device which connects it to a ground anchor cable.

A still further object of the present invention is to provide such a device which will be simple and inexpensive to manufacture.

In the embodiment of the invention described, the foregoing objects are achieved by the provision of a cable connecting device comprising, improved means for adjustably and releasably gripping a ground anchor cable at a selected distance from a ground anchor and improved means for holding and snubbing a catenary cable of an air-supported shelter so as to minimize sawing or abrading of the catenary cable by the cable connecting device. The invention includes in its scope the features recited.

Referring now to the accompanying drawings wherein one embodiment of the invention is shown and wherein like reference characters designate corresponding parts in the several views and wherein:

FIGURE 1 is an exploded view, in perspective, of the cable connecting device;

FIGURE 2 is a front elevation of the assembled cable connecting device;

FIGURE 3 is a rear elevation of the face plate, and showing in addition a portion of a ground anchor cable threaded through three holes in the face plate; and FIGURE 4 is a cross-section of the cable connecting device taken along line 4—4 of FIGURE 2.

Referring now to the drawing, the cable connecting device of the present invention designated generally by reference numeral 10 comprises a body member or face plate 11 and a clamping means comprising a clamping plate 12 and a clamping screw 13. The face plate is provided with an internally threaded hole 14, passing through from front to rear of the face plate near the center of the face plate; and the clamping plate is provided with an unthreaded hole 15 passing through from front to rear of the clamping plate through which clamping screw 13 is adapted to pass freely and mate with threaded hole 14 in the face plate to complete assembly of the cable connecting device.

The face plate is also provided with three unthreaded openings or holes, 16, 17 and 18, passing therethrough from front face to rear face thereof and of such diameter as to accommodate a ground anchor cable 19. Hole 16 is located near the lower end of the face plate. Holes 17 and 18 are located adjacent to the upper end of the face plate in a groove 20 running transversely across the front of the face plate. A lip 21 overhangs groove 20 at the upper end of the face plate for the purpose of keeping the ground anchor cable in groove 20 during threading of the device and when adjustments are being made.

The rear face of face plate 11 is provided with a serrated portion 22; and clamping plate 12 is provided with a serrated front face 23. When the device is assembled, the two serrated surfaces face each other and cooperate in firmly gripping the ground anchor cable 19 between them.

Face plate 11 is also provided with flanges 24 along its sides and extending to the rear sufficiently to accommodate the ground anchor cable and the clamping plate. These flanges assist in the threading of the ground anchor cable into the cable connecting device and during the adjusting of the device on the ground anchor cable by confining the ground anchor cable to the area between the two serrated surfaces.

The face plate is also provided with a bifurcated hook portion 25 formed as an integral part of the face plate and located in the proximity of the upper end of the face plate, extending outwardly and downwardly from the front face of the face plate so that the more or less pointed ends of the two arms 26 of the bifurcated hook portion extend downwardly to a point slightly below a horizontal plane passing through the center of clamping screw 13.

The face plate has a ridge portion 27 in its front face lying above hole 14 and between the two arms or prongs 26 of bifurcated hook portion 25 and extending generally parallel to the two arms of the bifurcated hook portion. This ridge portion is designed to cooperate with the bifurcated hook portion in producing a snubbing action on the catenary cable and in minimizing, if not completely eliminating, transverse motion of the catenary cable across the front face of the face plate, with consequent sawing or abrading of the catenary cable.

When the cable connecting device is assembled, the pointed ends and the inner surfaces of the arms 26 adjacent to the clamping screw 13 are spaced away from the end of the clamping screw sufficiently to permit a loop of a catenary cable 28 to be passed around the end of the clamping screw and under each of the arms 26.

In the use of the present invention, when it is desired to erect an air-supported shelter, the free end of a ground anchor cable, such as 19, which is attached to a ground anchor (not shown), anchored in the ground, is threaded through hole 16 from front to rear of face plate 11, thence along serrated portion 22 of the rear face of the face plate to hole 18, thence through hole 18 to the front of face plate 11, thence along the front of the face plate in groove 20 to hole 17, thence through hole 17 to the rear of the face plate, thence along serrated portion 22. Clamping plate 12 is placed between flanges 24 with its serrated front face 23 in contact with the ground anchor cable and so that hole 15 is aligned with threaded hole 14 of the face plate. The threaded end of clamping screw 13 is passed through hole 15 and mated with threaded hole 14 in the place plate. After spacing the cable connecting device a desired distance from the ground anchor or the point at which the ground anchor cable emerges from the ground, clamping screw 13 is turned sufficiently to grip the ground anchor cable tightly between the clamping plate and the face place. The ground anchor cable is thus snubbed at the peripheral surfaces of holes 16, 17 and 18 and is also gripped by serrated surfaces 22 and 23.

The cable connecting device is now ready for coupling with a catenary cable 28 of an air-supported shelter (not shown). For this purpose, the air-supported shelter will normally be deflated. A free loop of the catenary cable, which is not under tension, is pinched so that it will pass over the end of clamping screw 13 and between the threaded end portion of the clamping screw and the arms of bifurcated hook portion 25. The pinched loop is then released so that the catenary cable is engaged by the arms of the bifurcated hook portion. This procedure is repeated for each of the several ground anchor cables and cable connecting devices around the periphery of the shelter. When all of the ground anchor cables have been coupled with free loops of the catenary cable, the shelter is inflated. During the early stages of inflation of the shelter, before pressure in the shelter builds up appreciably, it is possible to adjust the position of the cable connecting device on the ground anchor cable by loosening clamping screw 13 and moving the cable connecting device with respect to the ground anchor cable, then retightening clamping screw 13. Also, before and during the early stages of inflation of the shelter, before pressure builds up therein, it is possible to adjust the cable connecting device with respect to the catenary cable. However, after appreciable tension is applied to the catenary cable by the expansion of the air-supported shelter, it is no longer possible to make such adjustments; and after enough pressure has been applied to fully expand the air-supported shelter, the catenary cable is so effectively snubbed by the cable connecting device that even when the shelter is subjected to high velocity winds, practically no movement of the catenary cable occurs transversely with respect to the cable connecting device. Consequently, substantially no sawing or abrading action on the catentry cable can occur when the shelter is fully inflated. Furthermore, during or after inflation of the shelter, it is virtually impossible for the catenary cable to become accidentally disconnected from the cable connecting device since the threaded end of clamping screw 13 extends sufficiently far through the space between the two arms of the bifurcated hook portion 25 to prevent the catenary cable from dropping out of engagement by the bifurcated hook portion even when the catenary cable is in a relaxed condition. To disengage the catenary cable it would be necessary to pinch it purposely and reverse the above-described steps by which the cable connecting device was connected to the catenary cable, an action which is impossible while the catenary cable is under any tension.

Upon completion of the assembly and connection of the cable connecting device to both a ground anchor cable and an exposed portion of a catenary cable at a point between the ends of the catenary cable, and upon inflation of the air-supported shelter, in the base of which the catenary cable is threaded, the longitudinal axes of the two cables are generally perpendicular to each other.

It can be seen that the present invention provides a simple, yet effective means for connecting a ground anchor cable to the catenary cable of an air-supported shelter. The combination of snubbing surfaces provided by the peripheral surfaces of the unthreaded holes in the face plate together with the serrated clamping surfaces of the two plates and the flanges along the sides of the face plate insure that the ground anchor cable is maintained substantially free of slippage, thus overcoming one of the greatest disadvantages of the cable connecting devices of the prior art. Easy adjustability with respect to a ground anchor cable and ground anchor is provided. The bifurcated hook portion in combination with the ridge portion on the front face of the face plate lying between the two arms of the bifurcated hook portion substantially eliminates the sawing or abrading of the catenary cable. The location and dimensions of the clamping screw in relation to the two arms of the bifurcated hook portion are such as to permit easy connection of the cable connecting device to a catenary cable when the shelter is being prepared for erection while preventing accidental disconnection of the catenary cable from the cable connecting device before, during or after inflation of the air-supported shelter.

It will be understood that various changes in the details, materials of construction, steps, and arrangements of parts, which have been herein described and illustrated in order to explain the nature of the invention, may be made by those skilled in the art within the principle and scope of the invention as expressed in the appended claims.

I claim:

1. A connecting device for releasably and adjustably joining the free end of a first cable to a second cable at a point between the ends thereof where the longitudinal axis of said first cable is generally perpendicular to the longitudinal axis of said second cable comprising:
  (a) a body member having front and rear faces, said body member being provided with an opening therethrough extending from the front face thereof to the rear face thereof and having a bifurcated hook portion extending outwardly and downwardly from the front face thereof for engaging said second cable, and
  (b) clamping means movable with respect to the rear face of said body member for clamping said first cable to said body member, said clamping means including a portion extending through said opening in said body member and between the arms of said bifurcated hook portions thereof to restrict disengagement of said second cable from said hook portion.

2. A connecting device for releasably and adjustably joining the free end of a first cable to a second cable at a point between the ends thereof where the longitudinal axis of said first cable is generally perpendicular to the longitudial axis of said second cable comprising:

(a) a body member having front and rear faces, said body member being provided with an opening therethrough extending from the front face thereof to the rear face thereof and having a bifurcated hook portion extending outwardly and downwardly from the front face thereof for engaging said second cable, the front face of said body member having a ridge portion thereon between the arms of said bifurcated hook portion and extending generally parallel thereto, said ridge portion being positioned to cooperate with said arms to impart a snubbing effect on said second cable when said second cable is engaged by said bifurcated hook portion, and (b) clamping means movable with respect to the rear face of said body member for clamping said first cable to said body member, said clamping means including a portion extending through said opening in said body member and between the arms of said bifurcated hook portion thereof to restrict disengagement of said second cable from said hook portion.

3. A connecting device for releasably and adjustably joining the free end of a first cable to a second cable at a point between the ends thereof where the longitudinal axis of said first cable is generally perpendicular to the longitudinal axis of said second cable comprising:

(a) a body member having front and rear faces and provided with a threaded opening therethrough extending from the front face to the rear face thereof, (b) a clamping plate having an opening therethrough, and (c) a clamping screw extending through the opening in said clamping plate and engaging in the threaded opening in said body member for moving said clamping plate into clamping relation with the rear face of said body member, said clamping screw extending through said body member substantially beyond the front face thereof, the front face of said body member having a bifurcated hook portion extending outwardly and downwardly from the upper portion thereof, said hook portion extending downwardly on each side of said clamping screw to a point below a horizontal plane passing through the center of said clamping screw and being spaced from said screw whereby a cable of predetermined size may be passed between said clamping screw and the arms of said bifurcated hook portion, said front face having a ridge portion thereon between the arms of said bifurcated hook portion and extending generally parallel thereto, said ridge portion being positioned to cooperate with said arms to impart a snubbing effect on a cable of predetermined size engaged by said bifurcated hook portion.

4. A connecting device for releasably and adjustably joining the free end of a first cable to a second cable at a point between the ends thereof where the longitudinal axis of said first cable is generally perpendicular to the longitudinal axis of said second cable comprising:

(a) a body member having front and rear faces and provided with a threaded opening therethrough extending from the front face to the rear face thereof, said body member being provided with two additional openings therethrough near the upper end thereof and spaced laterally one from the other and a third additional opening therethrough centrally located near the lower end of said body member, said additional openings being sized to permit said first cable to be threaded therethrough, (b) a clamping plate having an opening therethrough, and (c) a clamping screw extending through the opening in said clamping plate and engaging in the threaded opening in said body member for moving said clamping plate into clamping relation with the rear face of said body member, said clamping screw extending through said body member substantially beyond the front face thereof, the front face of said body member having a bifurcated hook portion extending outwardly and downwardly from the upper portion of said front face, said bifurcated hook portion extending downwardly on each side of said clamping screw to a point below a horizontal plane passing through the center of said clamping screw and being spaced from said screw whereby a cable of predetermined size may be passed between said clamping screw and said bifurcated hook portion.

5. A connecting device for releasably and adjustably joining the free end of a first cable to a second cable at a point between the ends thereof where the longitudinal axis of said first cable is generally perpendicular to the longitudinal axis of said second cable comprising:

(a) a body member having front and rear faces provided with a threaded opening therethrough extending from the front face to the rear face thereof and having opposed flanges extending rearwardly from the rear face thereof along at least a portion of each side of said body member, (b) a clamping plate receivable between said opposed flanges and having an opening therethrough, and (c) a clamping screw extending through the opening in said clamping plate and engaging in the threaded opening in said body member for moving said clamping plate into clamping relation with the rear face of said body member, said clamping screw extending through said body member substantially beyond the front face thereof, said body member being provided with two additional openings therethrough near the upper end thereof and spaced laterally one from the other and a third additional opening therethrough centrally located near the lower end of said body, said additional openings being sized to permit said first cable to be threaded therethrough, the front face of said body member having a bifurcated hook portion having two arms extending outwardly and downwardly from the upper portion of the front face thereof, said arms of said bifurcated hook portion extending downwardly on each side of said clamping screw to a point below a horizontal plane passing through the center of said clamping screw and being spaced from said clamping screw whereby a cable of predetermined size may be passed between said clamping screw and the arms of said bifurcated hook portion, said front face having a ridge portion thereon between the arms of said bifurcated hook portion and extending generally parallel thereto, said ridge portion being positioned to cooperate with said arms to impart a snubbing effect on a cable of predetermined size engaged by said bifurcated hook portion.

6. In a device for connecting the catenary cable of an air-supported shelter to a ground anchor cable of the type having a body member, a clamping plate, and a clamping screw, said clamping screw passing through said clamping plate and said body member and mating with a threaded hole in said body member, the improvements therein which comprise:

(a) hook means comprising two prongs arranged side-by-side adjacent to one end of said body member for engaging said catenary cable, said two prongs being spaced apart to permit said clamping screw to pass between the end portions of said prongs and prevent said catenary cable from accidentally dropping out of engagement with said hook means, and (b) snubbing means for said ground anchor cable comprising the peripheral surfaces of three holes passing through said body member and through which said ground anchor cable is threaded, two of said holes being located above said hook means and spaced apart laterally of said body member and the third hole being located near the opposite end of said body member, whereby said ground anchor cable is snubbed by the peripheral surfaces of said three holes of said snubbing means and clamped by said clamping plate when said clamping screw is tightened.

7. In a cable connecting device for an air-supported shelter of the type having a body member, a clamping plate, and a clamping screw, said clamping screw passing through said clamping plate and said body member and mating with a threaded hole in said body member, the improvements therein which comprise:
 (a) hook means comprising two prongs arranged side-by-side adjacent to one end of said body member for engaging a first cable, said prongs being spaced apart to permit a portion of said clamping screw to pass between the end portions of said prongs and to restrict disengagement of said first cable from said hook means,
 (b) first snubbing means comprising a ridge portion on the front face of said body member between the two prongs of said hook means and generally parallel thereto for snubbing said first cable, when said cable is engaged under said prongs, and
 (c) second snubbing means comprising three holes passing through said body member, through which a second cable is threaded, two of said holes being above said hook means and spaced apart laterally of said body member and the third hole being located near the opposite end of said body member, whereby said second cable is threaded through said three holes and between said clamping plate and said body member and is snubbed and clamped when said clamping screw is tightened.

8. In a cable connecting device for an air-supported shelter of the type having a body member, a clamping plate, and a clamping screw, said clamping screw passing through said clamping plate and said body member and mating with a threaded hole in said body member, the improvements therein which comprise:
 (a) hook means comprising two prongs extending from the front face of said body member and arranged side-by-side near one end of said body member for engaging a catenary cable of said air-supported shelter, said prongs being spaced apart to permit a portion of said clamping screw to pass between the end portions of said prongs to restrict disengagement of said catenary cable from said hook means,
 (b) first snubbing means comprising a ridge portion on the front face of said body member between the two prongs of said hook means for snubbing said catenary cable when said cable is engaged under said prongs,
 (c) second snubbing means comprising the peripheral surfaces of three holes passing through said body member to permit a ground anchor cable to be threaded therethrough, two of said holes being above said hook means and spaced apart laterally of said body merber and the third hole being adjacent to the opposite end of said body member,
 (d) serrated clamping means comprising a serrated rear surface of said body member and a serrated front surface of said clamping plate, and
 (e) restricting means for said ground anchor cable comprising flanges along the two sides of said body member extending rearwardly from the rear face thereof to restrict movement of said ground anchor cable sidewise of said cable connecting device while providing for free movement of said ground anchor cable lengthwise of said cable connecting device when said clamping screw and clamping plate are retracted from said body member;
whereby said ground anchor cable and said catenary cable are held in substantially non-slipping relation to said cable connecting device.

References Cited by the Examiner

UNITED STATES PATENTS 1,740,899  12/29  Mooney.
2,948,065  8/60  Simonic _____ 24—135

FOREIGN PATENTS 496,460  11/38  Great Britain.
98,293  3/23  Switzerland.

WILLIAM FELDMAN, *Primary Examiner.*

UNITED STATES PATENT OFFICE
CERTIFICATE OF CORRECTION

Patent No. 3,201,838                              August 24, 1965

John S. Brown

It is hereby certified that error appears in the above numbered patent requiring correction and that the said Letters Patent should read as corrected below.

Column 3, line 35, for "place" read -- face --; line 40, for "place" read -- plate --; column 4, line 3, for "catentry" read -- catenary --; column 8, line 17, for "merber" read -- member --.

Signed and sealed this 19th day of April 1966.

(SEAL)
Attest:

ERNEST W. SWIDER                                  EDWARD J. BRENNER
Attesting Officer                                     Commissioner of Patents